US012717917B2

(12) United States Patent
Duplys

(10) Patent No.: US 12,717,917 B2
(45) Date of Patent: Aug. 25, 2026

(54) PERSISTENT SECURITY CONFIGURATION MONITORING

(71) Applicant: Robert Bosch GmbH, Stuttgart (DE)

(72) Inventor: Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 296 days.

(21) Appl. No.: 17/662,353

(22) Filed: May 6, 2022

(65) Prior Publication Data

US 2022/0382865 A1 Dec. 1, 2022

(30) Foreign Application Priority Data

May 27, 2021 (DE) ..................... 10 2021 205 385.8

(51) Int. Cl.

*G06F 21/56* (2013.01)
*G06F 21/54* (2013.01)
*G06F 21/55* (2013.01)

(52) U.S. Cl.

CPC ............ *G06F 21/566* (2013.01); *G06F 21/54* (2013.01); *G06F 21/554* (2013.01); *G06F 21/568* (2013.01)

(58) Field of Classification Search

CPC ...... G06F 21/566; G06F 21/54; G06F 21/568; G06F 21/554; G06F 21/56; G06F 21/57; G06F 21/53

See application file for complete search history.

(56) References Cited

U.S. PATENT DOCUMENTS

| | | | | |
|---|---|---|---|---|
| 9,672,355 B2 * | 6/2017 | Titonis | .................. | H04W 12/12 |
| 2004/0107125 A1 * | 6/2004 | Guheen | .................. | G06Q 50/01 705/319 |
| 2007/0061597 A1 * | 3/2007 | Holtzman | ............... | G06F 21/10 713/181 |
| 2007/0180524 A1 * | 8/2007 | Choi | ....................... | G06F 21/52 726/23 |
| 2009/0240348 A1 * | 9/2009 | Chand | .................. | G05B 19/056 700/12 |
| 2012/0066665 A1 * | 3/2012 | Kunze | ................ | G06F 11/3409 717/124 |
| 2013/0019315 A1 * | 1/2013 | Chen | ..................... | G06F 21/577 726/25 |

(Continued)

*Primary Examiner* — Meng Li
*Assistant Examiner* — Taylor P Vu
(74) *Attorney, Agent, or Firm* — NORTON ROSE FULBRIGHT US LLP

(57) ABSTRACT

A computer implemented method for persistent security configuration monitoring of a persistent configuration record defining a configurable software and/or hardware system over a plurality of lifecycle stages of the system. The method includes during a first lifecycle phase of the system, automatically performing a first security task using a first automation engine according to a first configuration of the automation engine, wherein the first configuration defines a target action to be performed by the first automation engine, and an event detectable by the first automation engine that triggers the target action, detecting, using the first automation engine, the event, updating, using the first automation engine, a portion of the persistent configuration record relating to the first lifecycle phase, and triggering, via the first automation engine, at least one security task in response to the detection of the event.

21 Claims, 6 Drawing Sheets

(56) References Cited

U.S. PATENT DOCUMENTS

2015/0317475 A1* 11/2015 Aguayo Gonzalez ........................ G06F 21/755 726/23
2017/0024299 A1* 1/2017 Deng .................. G06F 11/3414
2017/0220331 A1* 8/2017 Seibel ....................... G06F 9/54
2017/0221279 A1* 8/2017 Yu ........................... G06F 21/57
2018/0121659 A1* 5/2018 Sawhney .............. G06F 21/566
2019/0028350 A1* 1/2019 Yeung ..................... H04L 43/14
2019/0042736 A1* 2/2019 Krebs ................. H04L 63/1491
2019/0245867 A1* 8/2019 Ben David ............. H04L 63/14
2019/0384914 A1* 12/2019 Awate ................ H04N 21/4437
2020/0074076 A1* 3/2020 Gammel ................. G06F 21/52
2020/0183679 A1* 6/2020 Hashimoto ............. H04L 41/22
2020/0341888 A1* 10/2020 Sridhar ............... G06F 11/3692
2020/0387836 A1* 12/2020 Nasr-Azadani ........ G06N 20/20
2021/0034752 A1* 2/2021 Canada ................. G06F 21/552
2021/0067536 A1* 3/2021 Mylrea ................. H04L 9/3239
2021/0120042 A1* 4/2021 Lopez ................. H04L 41/0816
2021/0203682 A1* 7/2021 Bajpai ................. H04L 63/0435
2021/0218758 A1* 7/2021 Jain ......................... G06F 9/545
2021/0326065 A1* 10/2021 Kesavan ................. G06F 3/067
2022/0129301 A1* 4/2022 Adeyenuwo .......... G06F 9/4843

* cited by examiner

70a
SPEC
DESK
MPL
OPRS
EVENT
72a
72b
72c
72d
T = 0
70b
SPEC
EVENT
I MPL
DESK
MPL
OPRS
EVENT
72a
72b
72c
72d
T = 1

PERSISTENT SECURITY CONFIGURATION MONITORING

CROSS REFERENCE

The present application claims the benefit under 45 U.S.C. § 119 of German Patent Application No. DE 10 2021 205 385.8 filed on May 27, 2021, which is expressly incorporated herein by reference in its entirety.

FIELD

The present application relates to a computer implemented method for persistent security configuration monitoring of a persistent configuration record defining a configurable software and/or hardware system over a plurality of lifecycle stages of the system, and an associated system, computer readable medium, and embedded software and/or hardware system.

BACKGROUND INFORMATION

Electronic control units (ECUs) are developed according to a phased process, often structured within the "V-model" approach applied in automotive engineering. When a security vulnerability to a software and/or hardware system (such as an electronic control unit ECU for a motor vehicle) is discovered, it is increasingly difficult, given the complexity of modern embedded systems, to reconfigure the software and/or hardware of the system to address the security vulnerability in a timely fashion.

Discrete security monitoring tasks are often performed, and the operational non-compliances against a specification eventually reported back to an OEM, Tier 1, Tier 2, or Tier 3 suppliers for action to be taken. However, such security monitoring processes may be further improved.

SUMMARY

According to a first aspect of the present invention, there is provided a computer implemented method for persistent security configuration monitoring of a persistent configuration record defining a configurable software and/or hardware system over a plurality of lifecycle stages of the system. In accordance with an example embodiment of the present invention, the method comprises:

- during a first lifecycle phase of the system, automatically performing a first security task using a first automation engine according to a first configuration of the automation engine, wherein the first configuration defines a target action (a) to be performed by the first automation engine, and an event detectable by the first automation engine that triggers the target action;
- detecting, using the first automation engine, the event;
- upon detection of the event, updating, using the first automation engine, a portion of the persistent configuration record relating to the first lifecycle phase; and
- triggering, via the first automation engine, at least one security task in response to the detection of the event.

An effect is that a highly automated and high coverage cyber security life-cycle configuration management system is provided enabling an interconnection between automatic security-relevant observations occurring in a first lifecycle phase with automatic security-relevant actions that may be applied in a second life-cycle phase of an embedded software and/or hardware system. The automatic interconnection between life-cycle development stages means that as automatic security-relevant observations are made, technical activities such as unit testing generation or code recompilation may automatically be specified to occur in other life-cycle phases. In a case where an automatic security-relevant observations made at an early point in the development process, the subsequent life-cycle phases in that development process can be automatically upgraded or reconfigured to address the security-relevant observation made at an early point in the development process.

Alternatively, it may be the case that automated security-relevant observations occur at a late stage in the development process of a hardware or software system. In this case, a persistent configuration record of the hardware or software system may be updated so that when the life-cycle is repeated for the hardware or software system (for example, the life-cycle may be fully repeated as a technical design pattern for a subsequent related hardware or software system), the automated security-relevant observation occurring at a late stage in the development process can be accounted for at an earlier stage of the subsequent instantiation of the design process. Furthermore, the design process may be partially reiterated (for example a software implementation life-cycle phase may be rerun to generate a software update for a known hardware or software system according to an unchanged specification and development framework, albeit that automated security-relevant observations (such as bug reports or anomalous hardware signalling observations) may be used to automatically generate unit tests to be applied in the re-instantiated implementation phase.

Therefore, automated security-relevant observations performed by micro-service monitoring engines occurring at first life-cycle phase may be automatically accounted for in other life-cycle phases by other micro-service application engines, meaning that the observations are not lost or overlooked before implementing a solution to them. The hardware and software systems engineered according to such a persistent configuration record will, accordingly, be more resistant to security attacks, and more quickly reconfigured to resist security attacks. A persistent configuration record can be easily read by a machine learning algorithm trained to identify patterns in the technical implementation of a system defined as a result of several lifecycle stages.

The availability and scalability of micro-service provision means that if a significant number of automated security observations occur, for example, in an operational phase (for example, a new exploit affecting a core electronic control unit such as the CAN gateway is discovered), a similarly large number of persistent micro-services spawned in design or specification phases in future instantiations of the design process relating to the new exploit can be automatically generated without user intervention.

Therefore, a persistent configuration record encodes tasks to be performed in another security life-cycle phase in the future, or in a subsequent instantiation of the security life-cycle phase in the future, based on specific events or conditions triggering these tasks. The persistent configuration record is processed by a corresponding automation engine in a fully automated manner, enabling task and one life-cycle phase to be performed dependent on the outcomes events or other conditions in a different life-cycle phase in a fully automated manner.

According to a second aspect of the present invention, there is provided a computer system comprising at least one computing apparatus comprising a data memory, an input-output interface, and a processor, wherein the computer system is configured to perform the method according to the first aspect, or its embodiments.

According to a third aspect of the present invention, there is provided a computer readable medium or signal comprising computer readable instructions which, when executed by a computer processor, execute the method according to the first aspect, or its embodiments.

According to a fourth aspect of the present invention, there is provided an embedded software and/or hardware system configured according to the persistent configuration record generated according to the first aspect, or its embodiments, wherein the embedded software and/or hardware system is optionally an electronic control unit for controlling a vehicle.

In the following description, a "life-cycle stage" is a discrete time period during which a hardware and/or software system design is developed from a high-level concept, towards being technically mature and safe to release to customers. For example, in a specification phase, a system requirements analysis exercise may be undertaken to determine feature sets of the eventual product. In a design phase, the system requirements discovered in the specification phase enable decisions to be taken concerning the architecture and module design of the eventual design. A subsequent implementation phase enables the actual design of circuitry and implementation of computer code to transfer the previous system specification and design into a functional system. Unit testing may be applied in the implementation phase to ensure that each module of the functional system performs to expectations. Of course, a change in the specification or design stages also implies that new unit tests may need to be written in the implementation phase. Unit tests may be written by human analysts. However, unit tests can be automatically configured (populated) based on the software and/or hardware context. At the least, empty "stubs" for unit tests can be automatically populated based on an automatically detected need. Final compilation of a codebase may fail is automatically generated unit testing stubs are not completed such that they return a "pass" value to an automatic compiler. Integration, system, and acceptance testing test aspects of the design and specification to ensure that these requirements are met can therefore be automated to ensure that a software or hardware configuration with a noncompliance does not reach production, for example.

An operational phase occurs in which the product is in normal use, and the design does not change. However, the performance of the system may be measured against the specification and design. Furthermore, anomalous technical behaviour of a system in the operational phase is a significant technical cue that additional unit tests need to be introduced, and that more fundamental changes to the specification and design may be required.

In the following description, the term "persistent configuration record" refers to one or more data structures containing definitions of the design process and eventual hardware and/or software system. At early stages, the persistent configuration record may comprise high-level configuration statements such as "the system shall be resistant to a SPECTRE attack". At later stages, the persistent configuration record may comprise a highly heterogenous collection of data records defining the design of the hardware and/or software system that may be useful in determining the security of the system automatically. For example, the persistent configuration record may comprise software code in C, C++, assembler, Java, MISRA C, Autosar C++, hardware definition language such as Verilog or VHDL, circuit schematic diagrams, and the like.

It is not essential that the persistent configuration record contains a complete design of a hardware and/or software electronic system, although the more aspects of the design are included in the persistent configuration record, the more coverage of the design can be provided. Accordingly, when a new security-relevant event is detected (such as the detection of a new software exploit in an operational phase) this is stored in the persistent configuration record. It is then possible to automatically trace back to previous life-cycle phases on a critical path backwards from the new software exploit to automatically define new unit tests in the implementation phase, for example.

The persistent configuration record may contain entries defining the use context of an electronic control unit, or software, because these also impact on the security of software and hardware products. For example, the persistent configuration record may define the model of vehicle that the software and/or hardware is used in, the time that the vehicle is active, other types of software and hardware connected to the ECU, and the like.

Although many aspects of the present specification refer to automotive development and ECUs for automotive use, the specification is not so limited. The present invention discussed herein may be applied to a wide range of software, hardware, and mixed products and services having a complicated configuration that could evolve over at least two lifecycle phases.

In the following specification, a "security task" is an operation that can improve the security, or reduce the attack surface, of a hardware and/or software system.

BRIEF DESCRIPTION OF THE DRAWINGS

Exemplary embodiments are depicted in the figures, which are not to be construed as limiting the present invention, and are explained in greater detail below.

DETAILED DESCRIPTION OF EXAMPLE EMBODIMENTS

Figure 1:
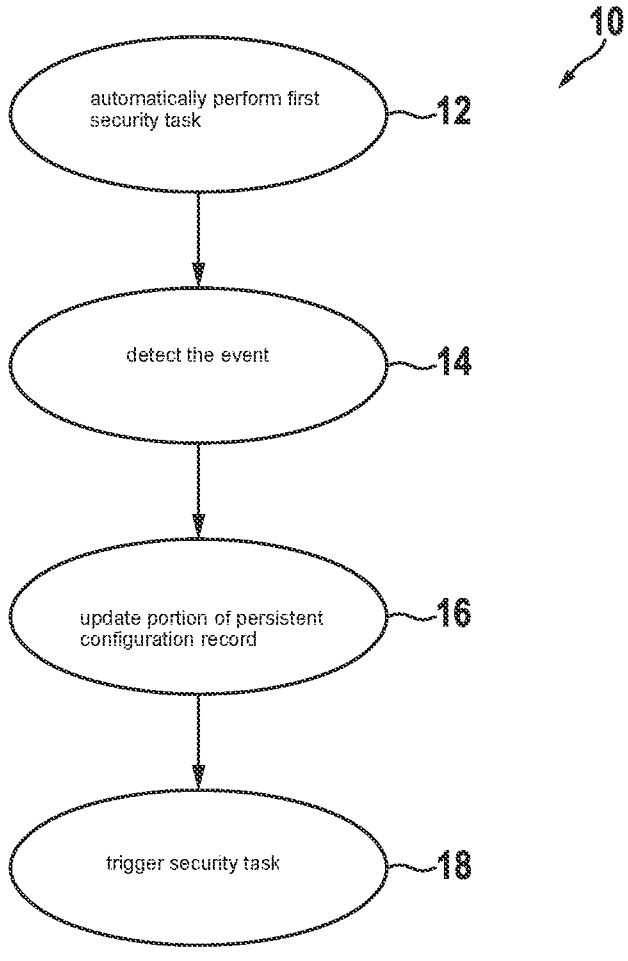
FIG. 1 schematically illustrates an example method according to the first aspect of the present invention.

Security events are the detection of an occurrence or exploit that may be detrimental to the security of an end product hardware or software system. The nature of the "event" is dependent on the part of a system in which the exploit is targeted. A complex embedded system such as an electronic control unit providing the context of, for example, a vehicle, presents a wide range of possible "events". Thus, the occurrence of an "event" is related to the type of attack services provided by the software and/or hardware system design, operating in its context.

Owing to the heterogeneity and speed at which security events proliferate, maintaining a technical configuration of a hardware and/or software system is increasingly difficult.

Examples of security events that may be relevant to an ECU are many and varied. ECUs that are wirelessly connected for receiving IEEE 802.11 WiFi (TM), V2X transmissions, and cellular transmissions may be vulnerable to eavesdropping, denial of service, or spoofing. Physical inputs of an ECU may be ports such as USB, Ethernet, CAN, or MOST. Furthermore, a system user may plug an infected hardware device (such as a compromised smart phone) into a USB port of ECU, thus making the software configuration or selection of applications used in third-party devices relevant to system security.

Internal vehicle communications such as CAN may connect together many different electronic control units, rendering them more vulnerable to eavesdropping or denial of service and multiplying the number of possible security events. Anomalous security events may be detected by monitoring anomalous patterns or bursts in CAN communications between electronic control units. Many sensors such as cameras and radars may provide attack vectors. Software executed by electronic control units may be compromised, for example.

Security events may also be unrelated to specific system hardware and software, but may be part of the operating context of a hardware and/or software system. For example, large numbers of new exploits are being discovered and continuously published in Internet databases. Attack equipment may change in value, thus making specific attacks more or less likely dependent on the cost of the attack equipment. If an exploit detected in the wider context of operation of the hardware and/or software system is relevant to a hardware and/or software system, it should be scored and if judged to be critical, existing hardware and/or software systems should be subject to a software patch to address the critical fault in the short term, and future design life-cycle phases should design out the critical fault in the long term as new iterations of electronic control units are designed.

The modern proliferation and interdisciplinary nature of security attacks presents challenges to effectively managing their risk different life-cycle phases.

The example considered in this application is that of a domain ECU in a highly automated vehicle. Such an ECU is a complicated and interconnected hardware and software system. However, a skilled reader, in view of the disclosure herein, will appreciate that the technique may be applied to software code development, hardware development, or a mixture of the two without limitation.

FIG. 1 schematically illustrates an example method according to the first aspect of the present invention.

According to a first aspect, there is provided a computer implemented method (10) for persistent security configuration monitoring of a persistent configuration record defining a configurable software and/or hardware system over a plurality of lifecycle stages of the system, comprising:

during a first lifecycle phase of the system, automatically performing (12) a first security task using a first automation engine (EP1) according to a first configuration (Cl) of the automation engine, wherein the first configuration defines a target action (a) to be performed by the first automation engine (EP1), and an event detectable by the first automation engine (EP1) that triggers the target action (a);

detecting (14), using the first automation engine (EP1), the event; and upon detection of the event, updating (16), using the first automation engine (EP1), a portion of the persistent configuration record relating to the first lifecycle phase; and triggering (18), via the first automation engine (EP1), at least one security task in response to the detection of the event.

Figure 2:
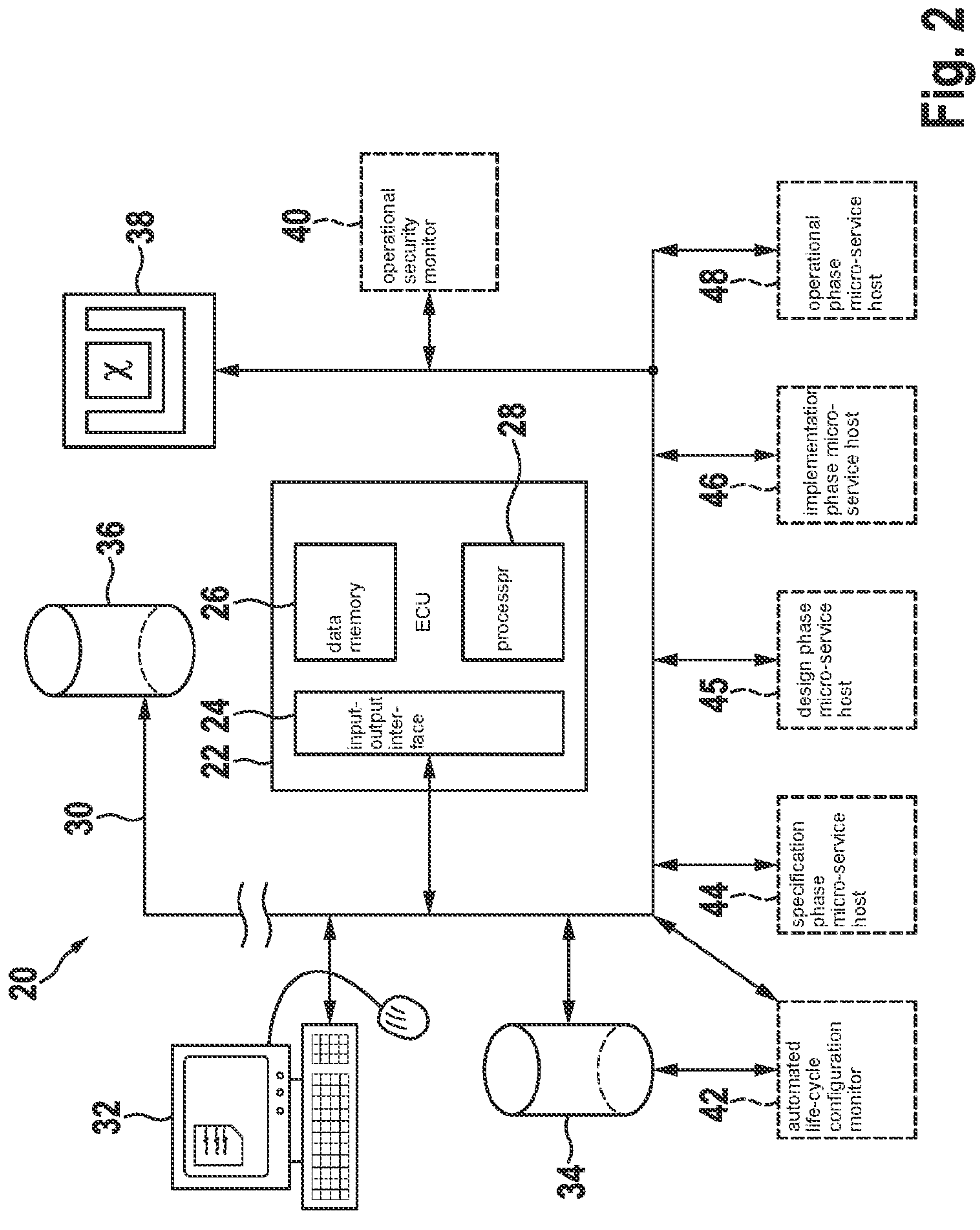
FIG. 2 schematically illustrates a persistent life-cycle development environment comprising an example system according to the second aspect of the present invention.

FIG. 2 schematically illustrates a persistent lifecyle development environment comprising a system 20 according to the second aspect. In a design and implementation phase of an ECU 22 life-cycle, the persistent life-cycle development environment of system 20 may perform as a security "test-bed" of the software and hardware configuration and development. In an operational phase of an ECU 22 life-cycle, the system 20 may perform as an operational monitor to examine the reaction of an ECU 22 configured according to a persistent configuration record that can be guaranteed to be uncompromised to certain new exploits, for example.

The system 20 may comprise a prototype or finalised electronic control unit ECU 22, comprising a data memory 26, an input-output interface 24, and a processor 28. The input-output interface 24 may, for example, comprise a CAN, MOST, Ethernet, 802.11p GSM or V2X communications interface, presenting an attack surface to the ECU 22, and by extension to other components connected to the ECU via the communication interface. An example, the ECU 22 may be connected, via the input-output interface 24, to "bare-metal" components and sensors such as components of a braking system, a radar system or car locking system, and the like (not illustrated).

The data memory 26 of the ECU 22 has a non-volatile and volatile component. The volatile component, for example, is RAM (Random Access Memory or Cache) used to support the execution of programs by the processor 28. The non-volatile component, for example, enables the long-term storage of operating software modules of the ECU. An example, the operating software modules of the ECU 22 may be partially or entirely updated according to a software update generated in a new instantiation of an implementation phase automatically triggered as security task as a result of automatic anomaly monitoring in an operational phase of the ECU 22 configuration.

The processor 28 of the ECU 22 is configured to load the operating software modules of the ECU 22 from the data memory 26 of the ECU 22, and to communicate to external devices connected to the ECU 22 via the input output interface 24 of the ECU 22.

Figure 5:
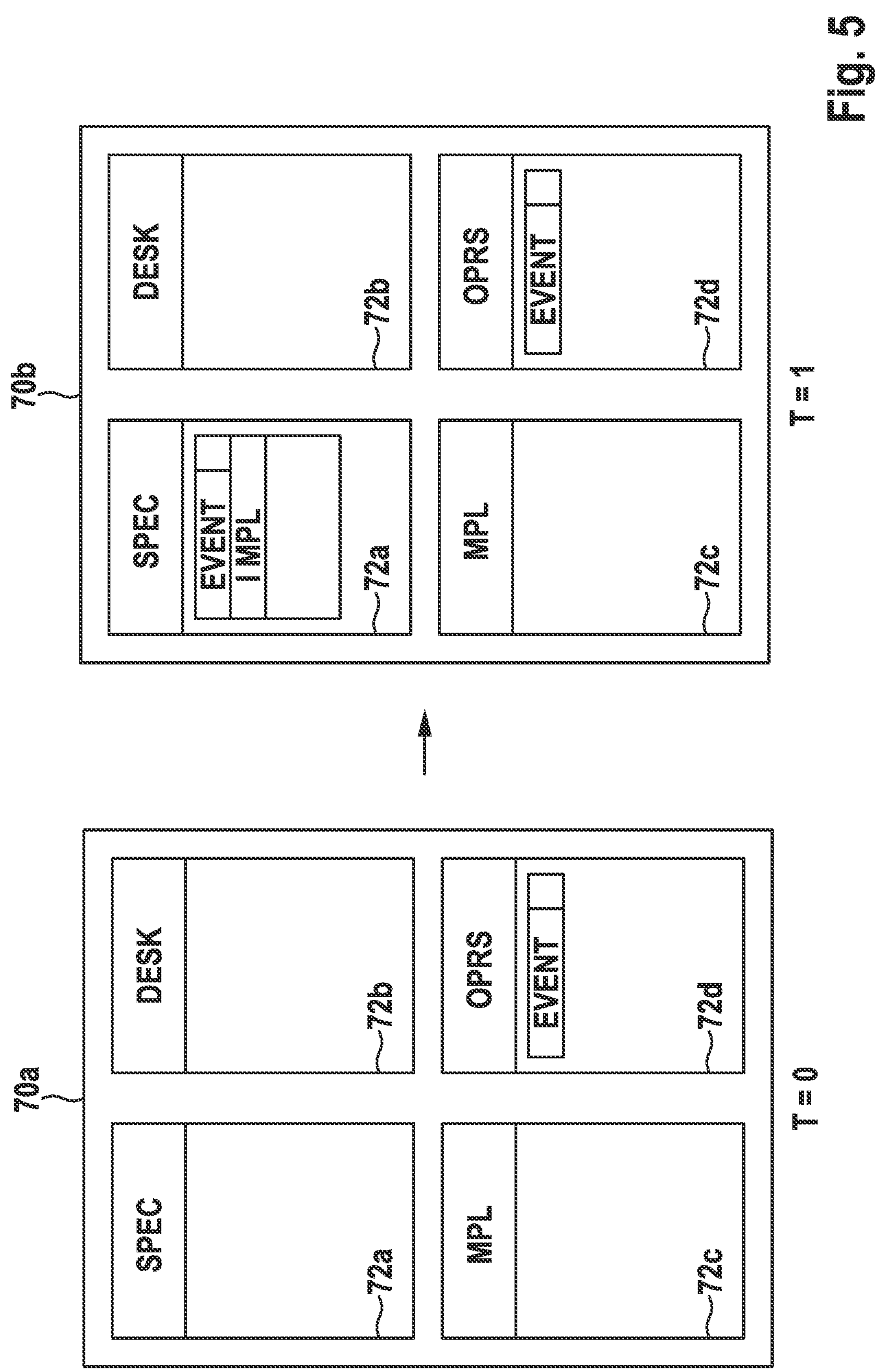
FIG. 5 schematically illustrates two versions of the same data structure comprising a persistent configuration record at different time points in response to the detection of a security event.

The system 20 may comprise a data network 30. The data network 30 is connected to a persistent configuration control interface 32 (which may be one or more personal computers, digital tablets, and the like) that is communicably coupled to a persistent configuration server 34. The persistent configuration server 34 holds one or more persistent configuration records defining configurable software stored, for example, in the data memory 22 of the ECU 22, and/or a hardware architecture to which the ECU 22 is coupled. The persistent configuration server 34 may comprise a reference instantiation (or design) an ECU 22, and variants of the reference instantiation targeted to a range of end use contexts (for example, there may be a variant of the reference instantiation for use in different vehicle designs, or snapshots of configurations of different software updates). An example data structure that could hold a persistent configuration record is illustrated in FIG. 5 subsequently.

Accordingly, in a specification, design, or implementation lifestyle phase, different configurations of the ECU 22 software and/or hardware may be uploaded from the persistent configuration server to rapidly test emerging threats, for example.

The system 20 further comprises a data connection to at least one threat database 36. The threat database 36 may, for example, be a database of software vulnerabilities, security advisories of companies and security firms, and the like. The threat database 36 may be automatically populated using a machine learning server (not shown) configured to crawl websites of research groups and software vulnerability databases automatically.

The system 20 further comprises a "hardware in the loop" testbed 38. The "hardware in the loop" testbed enables hardware (or "bare metal") components that would be connected to the electronic control unit 22 in an operational life-cycle phase to be communicatively coupled to the electronic control unit 22. For example, if attack vectors linked to vehicle vision subsystems and associated ECUs were a concern, the hardware in the loop testbed 38 may comprise a set of vehicle cameras and LIDARs for reproducing security vulnerabilities that could be introduced or injected via the vehicle vision subsystem.

The system 20 further comprises a plurality of micro-service hosts 44, 45, 46, 48. In an embodiment, a micro-service host is provided for each life-cycle phase. In the illustrated example, the system 20 comprises a specification phase micro-service host 44, a design phase micro-service host 45, an implementation phase micro-service host 46, and an operational phase micro-service host 48.

Each micro-service host 44, 45, 46, 48 is configured to operate an automation engine EP1-EP4 to be described subsequently. The function of the automation engine is to apply a configuration Ci at each life-cycle phase which may, in the example, comprise a declarative-style security specification consisting of a declaration of a target action (a), the definition of one or more events or conditions that will trigger the target action, and information on how the target action can be executed. An example, this information could be a link to corresponding micro-services with specific arguments used to call micro-services.

Each micro-service hosted on hosts 44, 45, 46, 48 can, for example, be accessed through a RESTful API by other components in the system 20. Each micro-service is defined and implemented in a way that it can be consumed in a fully automated manner upon automatically detected events occurring in past, present, and future life-cycle phases reflecting the configuration and use of ECU 22. Furthermore, each micro-service hosted on micro-service hosts 44, 45, 46, 48 may be accessed by an automated or human security analyst providing a continuous security assurance service.

At least one micro-service hosted on hosts 44, 45, 46, 48 can, for example, directly communicate the detection of an event signifying the presence of a security vulnerability in a first life-cycle phase to another micro-service hosted on hosts 44, 45, 46, 48 via communication over networks 30 with one of the other hosts. Alternatively, or in addition, when a micro-service hosted on one of hosts 44, 45, 46, 48 automatically detects the presence of a vulnerability in a first life cycle phase, the persistent configuration record 70*a*/70*b*. In an operational life-cycle phase of an ECU 22, at least one micro-service hosted by the operational life-cycle phase micro-service host 48 may detect a new security exploit of a software module operated by the ECU 22 via monitoring of the threat database 36. In response to this, the at least one micro-service hosted by the operational life-cycle phase micro-service host 48 writes a new entry to the persistent configuration record 70*a* 70*b* identifying the detected new security exploit 22. At least one other micro-service hosted by another life-cycle phase micro-service host may read the new entry written to the persistent configuration record 70*a* 70*b*. This may trigger the at least one other micro-service to perform at least one security task.

For example, in the case of the automatic detection of a threat in the threat database 36 relating to ECU 22 software, an operational phase micro-service may write into an operational phase record 72*d* of the persistent configuration record 70*a* that a security event of a given type has occurred. Upon a subsequent future instantiation of a life-cycle development process relating to the ECU 22 (this may be the development of a software update for existing ECU 22, or the development of an entirely new set of software for a future ECU design using the existing ECU 22 design as a reference), a specification life-cycle phase micro-service, a design life-cycle phase micro-service, and/or an implementation life-cycle phase micro-service may read the event written into the operational phase record 72*d* of the persistent configuration record 70*a* and form at least one security task in response.

For example, a design-phase micro-service may automatically read in the operational phase record 72*d* of the persistent configuration record 70*a* that a new threat was detected in the threat database 36. In response, the design-phase micro-service may automatically scan the software module list of the relevant ECU 22 design, and declare a design non-compliance against software modules affected by the new threat. Another micro-service may search for alternative software modules that are not affected by the new threat. If new modules are found, they may be substituted for the affected modules.

The system 20 further comprises at least one automated life-cycle configuration monitor server 42. The automated life-cycle configuration monitor 42 reads one or more persistent configuration records 70*a* 70*b* stored in persistent configuration server 34. The automated life-cycle configuration monitor server 42 is communicatively coupled with other elements of the system 30, and in particular the micro services hosted on hosts 44, 45, 46, 48. The automated life-cycle configuration monitor server 42 may, for example, be configured to generate data analytics and/or to perform unsupervised machine learning on the findings of the micro services and/or on the configuration of the persistent configuration record. As an example, they could produce results that are offered to other micro-services, and/or a human security analyst or operator.

In an example, the automated life-cycle configuration monitor server 42 is configured to monitor a plurality of life-cycle phases, and to perform as a "digital twin" of the entire cyber security life-cycle of the ECU 22 and its use context and history, for example. In this way, an evolution of more complicated patterns relating security non-compliances of particular ECU 22 configurations in an operational context partially characterised by the threats detected in the threat server 36 can be tracked across a plurality of life-cycle development phases.

In an example, the system 20 further comprises a gateway to an operational security monitor 40. The operational security monitor 40 may be a vehicle security information incident and event management system VSEIM 52, illustrated in FIG. 3 and discussed subsequently. The operational security monitor 40 may monitor one, or a plurality, of in-service vehicles or systems operating in their operational life-cycle phase. For example, a micro-service operating in the operational life-cycle phase micro-service host 48 may be configured to detect anomalous signals in real-world systems reported by the event management system VSEIM 52 via the operational security monitor 40. Upon detection of anomalous signals in a real-world system, the operational phase micro-service host 48 would update an operational record 72*d* of the persistent configuration record 70*a* 70*b*, thus triggering at least one other life-cycle micro-service to perform an action. For example, detection of an anomalous data transfer between ECU 22 executing a given version of a software module and another ECU during the operational phase triggers an in operational record 72*d*. In a design lifecycle phase of a subsequent instantiation of the lifecycle, the given version of the software module in ECU 22 is automatically reverted to a previous iteration that did not display the anomalous data transfer in the operational phase. An operator is informed that action should be taken to investigate the anomalous data transfer, and in the meantime a software module not displaying the anomalous behaviour is substituted.

Figure 3:
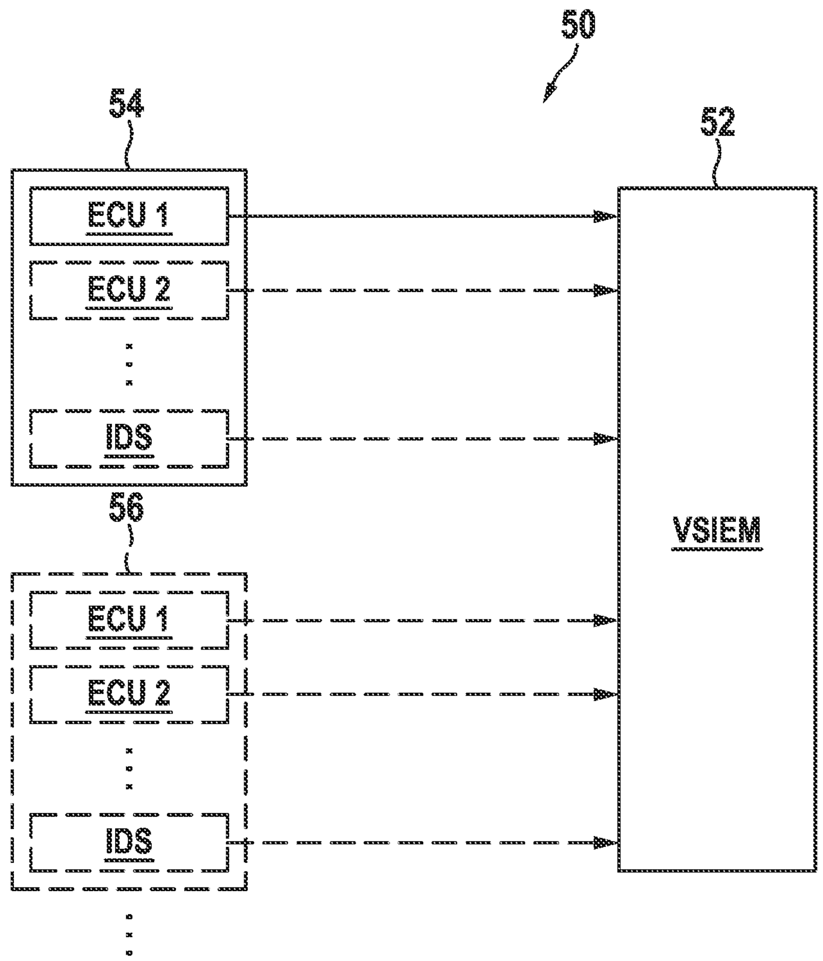
FIG. 3 schematically illustrates an approach for the detection of anomalous ECU states in a vehicle during an operational phase, in accordance with an example embodiment of the present invention.

FIG. 3 schematically illustrates an approach for the detection of anomalous ECU states in a system, in particular a vehicle, during an operational phase.

Vehicle system 50 comprises a first vehicle 54, and a second vehicle 56. Each vehicle comprises a plurality of ECUs. Furthermore, each vehicle comprises an intrusion detection sensor IDS. Each vehicle is configured to communicate watchdog signals from the plurality of ECUs and IDSs to the Vehicle Security Incident and Event Management System VSIEM 52. The VSIEM 52 is an example of a micro-service that may be executed on the operational phase micro-service host 48. The watchdog signals may represent an internal state of one or more of the ECUs. The watchdog signals may represent communication between one or more of the ECUs. The watchdog signals may comprise a digital signature of software modules executing in the one or more ECUs. The watchdog signals may be defined to detect a target action (a) occurring in one or more of the vehicles and report it to the VSIEM 52.

As an example, the IDS modules in the vehicles 54 and/or 56 may report to the VSIEM 52 the occurrence of, or may report watchdog signals enabling the diagnosis by the VSIEM of: electrical damage detected by at least one ECU, the installation of unsigned firmware updates detected by one or more ECU, an anomalous connection to internal vehicle communication ports of a CAN, MOST, or Ethernet network, tamper warnings associated with internal vehicle sensors, data storage integrity violations detected inside the vehicle such as the manipulation or copying of data stored in a memory of one or more of the ECUs, location information from a GNSS sensor associated with the vehicles, driving characteristics of the vehicle such as energy usage, actuation of the brakes, wheel speed, arbitrary code execution in a infotainment ECU, denial of service between 1 ECU and another ECU of the vehicle, and many other vulnerabilities.

Figure 4:
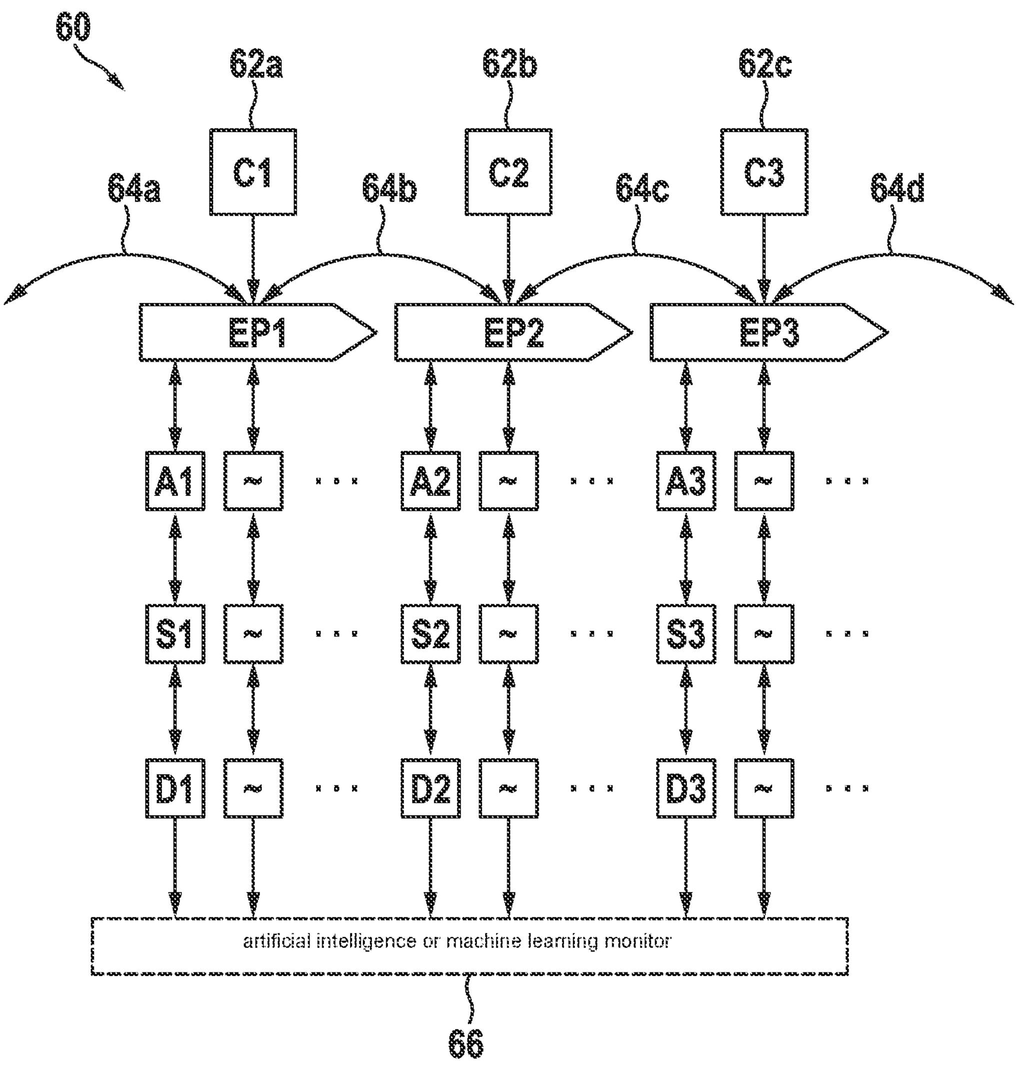
FIG. 4 schematically illustrates a microservice architecture for persistent security configuration monitoring, in accordance with an example embodiment of the present invention.

FIG. 4 schematically illustrates a microservice architecture 60 for persistent security configuration monitoring.

In an embodiment, the method comprises:

establishing a service oriented architecture platform hosting at least one microservice that is communicatively coupled to the first and/or second automation engine;

performing the first and/or second security tasks using the at least one microservice.

In this example, the micro-service architecture 60 is based on three automation engines EP1-3 applied in three corresponding life-cycle phases 62*a,b,c*. For example, the first automation engine EP1 coordinates micro-services that execute in the specification life-cycle phase. The second automation engine EP2 coordinates micro-services that execute in the implementation life-cycle phase. The third automation engine EP3 coordinates micro-services that execute in the operational phase. Of course, a skilled person will appreciate that a greater or fewer number of life-cycle phases may be tracked according to a corresponding number of automation engines provided.

Automation engine EP1 coordinates at least one micro-service S1. The at least one micro-service S1 implements one or more individual security tasks required to cover the product cyber security life-cycle needs at the given life-cycle phase. In an example, the micro-service may link to a hardware in the loop item 38 so that vulnerabilities discovered in software can be retested on the related hardware.

In an embodiment, the method comprises:

coupling the second automation engine to a Hardware in the Loop testbed configured to replicate one or more hardware components of the system; and performing the unit tests using the Hardware in the Loop testbed.

The automation engine EP1 may be linked to an associated data store D1 that holds all the necessary values for the micro-service S1. In other words, the associated data store D1 acts as persistent storage for this specific micro-service. Furthermore, the database D1 can provide short or long term data storage. In an example, the automation engine EP1 may detect an event corresponding to a target action. The automation engine EP1, upon detection of the event, updates a persistent configuration record. This enables inter-process communication 64*a,b,c* from the first life-cycle phase to one or more other life-cycle phases.

Inter-process communication forward between life-cycle phases EP1, EP2, and EP3 may imply, for example, deciding at automation engine EP1 to alter the design specification, which is communicated forward in time to automation engine EP2 operative in the design phase that substitutes software and/or hardware modules based on the altered design specification. Then, the altered software and/or hardware design provided by automation engine EP2 may be communicated to automation engine EP3 operative in the implementation phase. A micro-service in the EP3 automation engine may be configured to regenerate unit tests based on the changed software and/or hardware configuration mandated in the specification life-cycle phase and captured by automation engine EP1.

It is also possible for events occurring in a later life-cycle phase to determine actions applied to earlier life-cycle phases of a subsequent instantiation of the development process, as will subsequently be described.

Although FIG. 4 illustrates every automation engine EP1-3 only being linked to immediate predecessor or immediate successor phases in a security life-cycle, links may be made to any other predecessor or successor phases in the security life-cycle. This allows the triggering of security actions in a different life-cycle phase than a current life-cycle phase. For example, the interlinks between the different phases facilitate the implementation of rules such as "if a new vulnerability becomes known (for example, is published in the MVD database) create an issue in the development team issue tracking system to add unit tests that check whether this vulnerability is present in the product or service under test".

The determination of which life-cycle phase the design currently exists in may be made by human design configuration managers (for example, by setting one of a plurality of flags in the persistent configuration record). Alternatively, the determination of which life-cycle phase the design currently exists in may be made automatically. For example, if the unit tests at the end of an implementation phase are al passed automatically, then the implementation phase automation engine may detect this as an event, and signal that that the code and hardware design has passed testing and is considered to be in an operational phase.

The automation engines EP1-EP3 may, furthermore, be connected to an artificial intelligence or machine learning monitor 66 to enable patterns between events occurring in different life-cycle phases to be analysed. This In an embodiment, the at least one security task comprises updating a portion of the persistent configuration record defining the system with a first and second entry, wherein the first entry declares the detection of the event, and wherein the second entry is a lifecycle phase identifier recording the lifecycle phase that the event was detected in, to thus enable communication of the occurrence of the event from the first lifecycle phase to a second lifecycle phase.

The first entry may, thus be a semantic element defining the type of event detected, optionally with a time and/or location tag. Optionally, an entry may be provided defining a state of the ECU 22 or a system in which it is comprised in an operational phase, for example. The lifecycle phase identifier may, for example, by a number, code, flag, or other data element indicating to one or more microservices that the event has been detected, for example, in a specification, design, operational, or implementation phase.

In an embodiment, the method comprises:

during the second lifecycle phase of the system, reading the entry in the portion of the persistent configuration record relating to a second lifecycle phase of the system using a second automation engine (EP2));

comparing the entry declaring the detection of the event in the read portion of the persistent configuration record to a second target action defined by a second configuration of the second automation engine (EP2); and based on the result of the comparison, instantiating, using the second automation engine (EP2), a second security task to be performed by the second automation engine, and/or a further processing operation controlled by the second automation engine (EP2).

FIG. 5 schematically illustrates an example of two versions of the same data structure comprising a persistent configuration record at different time points in response to the detection of a security event.

At T=0, the initial version of the persistent configuration record 70*a* comprises a specification life-cycle phase record 72*a*, a design life-cycle phase record 72*b*, and implementation life-cycle phase record 72*c*, and an operational life cycle phase record 72*d*. "Event 1" has been detected in the operational phase, for example by a VSIEM 52 monitoring signals from one or more vehicles 54. Accordingly, a microservice operated by an automation engine executing in the operational life-cycle phase has written to the operational life cycle record 72*d* an update that an event has been detected.

At T=1, an iterated version of the persistent configuration record 72*b* illustrates that a further automation engine associated with the specification life-cycle phase has triggered a security task upon detection of the presence of "Event 1" in the implementation phase. Therefore, the next time that the life-cycle of the ECU 22 is iterated (for example, as part of a software update process), the anomaly automatically detected and noted in the operational phase can be accounted for when revising the specification.

The data structure comprising the persistent configuration record may be implemented in a range of different ways. The data structure may be comprised in a single database, or the individual life-cycle phase records 70*a*-70*d* and 72*a*-72*d* may be pointers to other databases, files, or data stores. The nature of the data stored in each of the individual life-cycle phase records 70*a*-70*d* and 72*a*-72*d* may be highly heterogenous. For example, the specification life-cycle phase record 72*a* may contain one or more high-level declarative statements as will be found in a specification such as "the ECU 22 should be resistant to SPECTRE attacks". The design life-cycle phase record may comprise high-level system architecture definitions, details of design decisions such as which processor and which software configurations have been selected to implement a system in accordance with the specification. The implementation life-cycle phase record may comprise records of code and/or HDL relating to the implementation of an ECU 22. Furthermore, the implementation life-cycle phase record may comprise results of automated unit testing performed on a given ECU 22 design iteration. The operational life-cycle phase record may comprise a log of ECU 22 usage. The operational life-cycle phase record may comprise a log of ECU 22 communications connections. The operational life-cycle phase record may comprise a log of unexpected communications non-compliance of an ECU 22. The operational life-cycle phase record may comprise a log generated by a vehicle security information incident and event management system VSEIM 52 described elsewhere in this specification.

In an embodiment, the first lifecycle phase is completed before the second lifecycle phase has begun, such that the updated portion of the persistent configuration record communicates the occurrence of the event into a future lifecycle phase.

In an embodiment, the second lifecycle phase is completed before the first lifecycle phase of a subsequent instantiation of the plurality of lifecycle stages of the system has begun.

Practical, non-limiting examples of the application of the automation engines EP1-3 according to a service-oriented architecture are now discussed in the context of persistent security automation that spans at least two life-cycle stages of our products security life-cycle. In a nonlimiting example, the persistent security automation may span the entire security life-cycle.

An example development process of an ECU may comprise four phases. A specification phase (SPEC) enables system requirements analysis exercise may be undertaken to determine feature sets of the eventual product. In the specification phase, one of the main tasks from the security perspective is the threat and risk analysis, in which, for each component of the ECU, a threat or attack tree is populated. The attack tree comprises a root node (representing a successful exploit) and a one or more child nodes (representing the security events that must occur in hardware or software in order for a security attack to be successful.

An example of a design life-cycle phase is a phase where an example security task that might lead to security vulnerabilities or ensure the presence of specific techniques and building blocks for protecting against certain attacks. For example, in the design phase a particular architectural decision or design pattern may be automatically detected as being vulnerable to a "return orientated programming" vulnerability. In response, a security task may be to automatically enter into a design phase record 72*b* of the persistent configuration record 70*b* that a technique such as address space layout randomisation (ASLR) should be included in the implementation phase.

An example of an implementation life-cycle phase task is the generation and performance of automated security tests, to test software and whether it contains bugs that lead to security vulnerabilities. Furthermore, a hardware in the loop test can be performed in the presence of the test software for a more realistic test environment.

An example of an operational life-cycle phase task is to monitor the system implemented as a result of the specification, design, and implementation life-cycle phases. For example, in an automotive application, at least one ECU may be monitored by a Vehicle Security Incident and Event Management System (VSIEM) as illustrated in FIG. 3. Alternatively or in addition, in vehicle monitoring solutions like CycurIDS (TM) by ETAS/ESCRYPT systems like the ARGUS in-vehicle network protection, or the ARILOU Sentinel-CAN system can identify signalling patterns in automotive networks that could detect an automotive intrusion detection state. Furthermore, the operational life-cycle phase may be to obtain information about the changing security environment in which the implemented ECU is operated. For example, professional vulnerability databases, newly published academic papers in the field of vulnerabilities, intelligence obtained from forums in the "dark net", security component manufacturers of ECU components. The obtained information may be compared to a of bill of materials or list of software components comprising a specific ECU version or vehicle. If a threat metric rises above a certain level, the operational life-cycle phase task may automatically generate a requirement for a new instantiation of a design phase ornamentation phase (for example, to generate a software update).

In a first example, operational life-cycle phase this new type of attack is detected, such as a SPECTRE or MELTDOWN attack is published in a vulnerability database. An automation engine may detect the presence of a new attack and classify its effect on an ECU 22 implemented according to a design specification by checking the attack tree of the ECU 22 defined in a specification life-cycle phase. If the specification phase automation engine detects that, based on a comparison of the new exploit to the attack tree (for example, by lexical analysis) of the ECU 22, the ECU 22 may be vulnerable to attack, a security alert may be published to human operators. Furthermore, the automation engine may signal to other automation engines responsible for the design life-cycle phase, and implementation life-cycle phases that alternative designs and implementation should be found until the vulnerability is addressed.

In a second example, an operational phase life-cycle engine may interrogate a vulnerability database 36 and identify that the price of a certain item of attack equipment relevant to the ECU has risen or fallen. Therefore, numerical values corresponding to the leaf of an attack tree in the specification section of the persistent configuration record may be updated. Accordingly, the automation engine responsible for the specification life-cycle phase is configured to rerun the threat and risk analysis. The ECU 22 security state is thus re-evaluated based on an observation in the field.

In a third example, an automation engine operative in the design life-cycle phase may detect a change in the design configuration of the ECU 22. This could be triggered by a new C++, Verilog or VHDL file being updated to a code repository, for example. Furthermore, in a model generated code base (based on ASCET, for example), a change in the model could be a triggering event. The design life-cycle phase automation engine communicates the change in design, via the persistent configuration record, to the implementation phase automation engine. The security tests applied in the implementation phase may be rerun in the context of the design change.

In a third example, if a new vulnerability appears in the public NBD vulnerability database, the implementation phase automation engine is configured to check the software BOM for versions of third party software components (including open source software) implemented in the ECU 22 and automatically create a bug report if the corresponding version (such as the version containing the known vulnerability) is part of the software BOM as implemented. Alternatively, the implementation phase automation engine may automatically create a stub of a unit test upon the appearance of the vulnerability in the vulnerability database. The stub of the unit test is configured to cause the cheques during the implementation phase to fail, and thus to halt the build process for the ECU software, until developers in the implementation phase have addressed the described vulnerability. The generated stub may be expanded into a full security test against the vulnerability, or may be deleted if it is considered that the vulnerability is not relevant.

Furthermore, if a bug is discovered in the implementation phase during security testing or an architectural flaw is discovered leading to a security vulnerability in the design phase, the system can automatically pass information during the operational phase and add this to behaviour that must be monitored for (for example, by the VSIEM 52).

In an embodiment, the first lifecycle phase is an operational phase (OPRS), and the second lifecycle phase is a specification phase (SPEC) of a subsequent instantiation of the plurality of lifecycle stages, and:

in the operational phase, the first automation engine (EP1) is configured to monitor a threat database for the publication of a new security vulnerability and to update a portion of the persistent configuration record relating to a specification phase (SPEC) of the system with a new record defining the new security vulnerability; and in the specification phase (SPEC) of the subsequent instantiation of the plurality of lifecycle stages, examining an attack tree of the system comprised in the portion of the persistent configuration record relating to the specification phase (SPEC).

In an embodiment, the first lifecycle phase is an operational phase (OPRS), and the second lifecycle phase is a specification phase (SPEC) of a subsequent instantiation of the plurality of lifecycle stages, and:

in the operational phase, observing, using the first automation engine to obtain qualitative information concerning the threat environment related to the system;

in the operational phase, updating a portion of the persistent configuration record associated with the specification phase using the first automation engine; and in the specification phase (SPEC) of a subsequent instantiation of the plurality of lifecycle stages, using the second automation engine to adjust a threat assessment score of the system, or a component of the system defined in the portion of the persistent configuration record associated with the specification phase.

Figure 6:
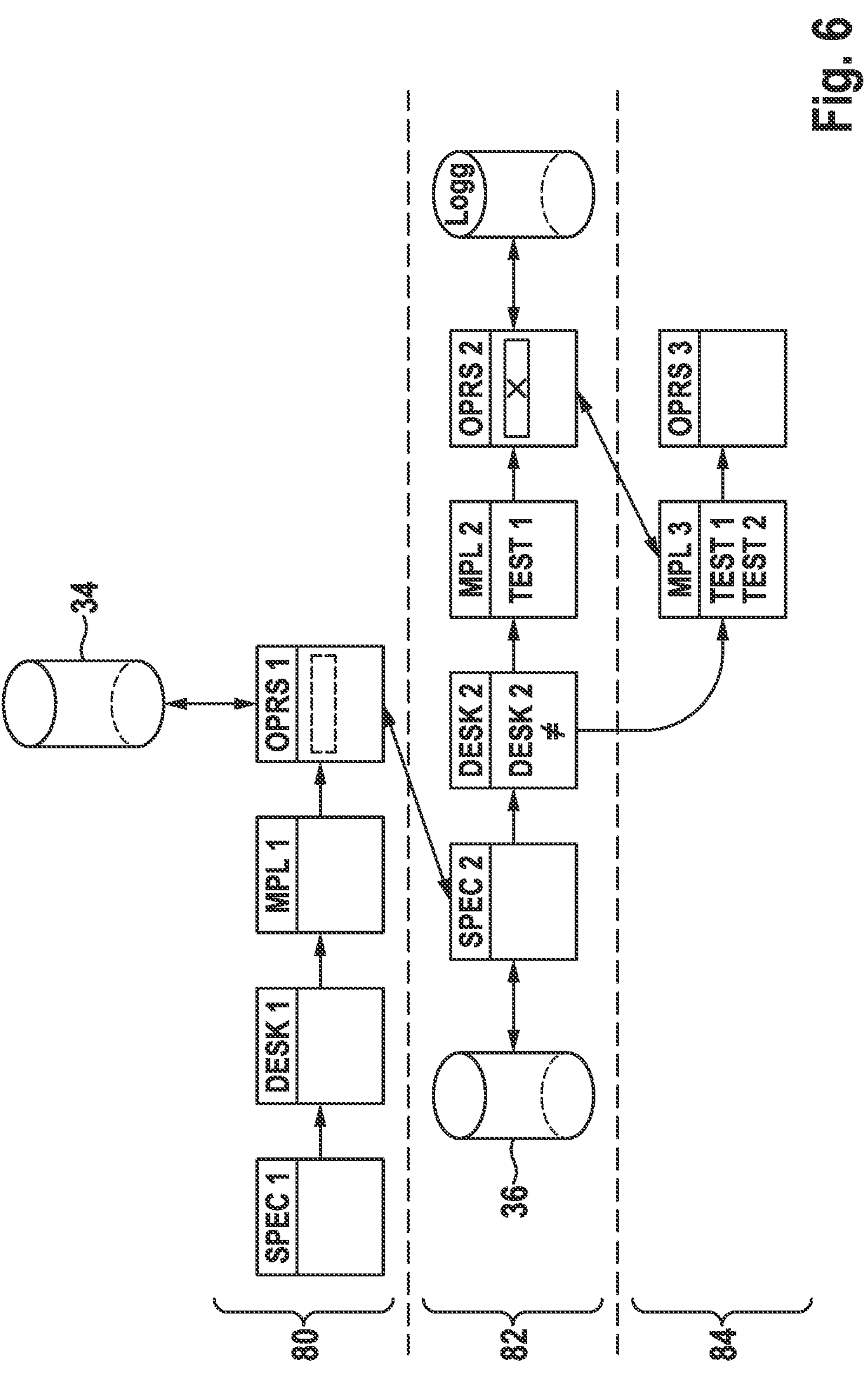
FIG. 6 schematically illustrates a plurality of instantiations of life-cycle and progressive automatic adaptation based on a persistent security configuration record.

FIG. 6 schematically illustrates a plurality of instantiations of life-cycle and progressive automatic adaptation based on a persistent security configuration record.

Track 80 illustrates an initial life-cycle development process of an ECU 22, iterating through specification, design, implementation, and operational life-cycle phases, and monitored at each life-cycle phase by one of four automation engines. During the operational life-cycle phase OPRS1, a CAN bus anomaly is detected by a VSIEM monitoring a vehicle as an event detectable by the operational life-cycle phase automation engine, and the automation engine performs the target action of writing the occurrence of the CAN bus anomaly, and details of the anomaly, to a persistent configuration record stored in server 34. This task may be performed by a micro-service in the operational life-cycle phase micro-service host 48.

Track 82 illustrates a subsequent "ab initio" life-cycle development process of another version (or an updated version) of ECU 22, in which the entire design of ECU 22 is reconsidered. This may be considered to be a future instantiation of the initial life-cycle development process which is intended to generate an updated ECU 22 design using technical feedback from the initial ECU 22 life-cycle of track 80. In particular, at the specification life-cycle phase SPEC2, the specification life-cycle phase micro-service host 44 is configured to detect in the persistent configuration record the occurrence of the CAN bus anomaly detected in previous operational life-cycle phase OPRS1. This triggers a specification life-cycle phase micro-service host 44 to perform a security task using a micro-service of interrogating the threat database 36 using the details of the anomaly. In response, the threat database 36 may suggest a solution of automatically altering the specification in SPEC2 to require that a particular CAN port be disabled. As the life-cycle illustrated in track 82 moves to the design life-cycle phase DESG2, hardware and/or software configurations of the design may be automatically adjusted to close off the particular CAN port automatically specified in the SPEC2 phase.

An implementation phase micro-service host 46 runs a micro-service to automatically compare the design of the previous instantiation in DESG1 with the design resulting from life-cycle phase DESG2. The implementation phase micro-service host 46 may, for example, operate a verification coverage comparison micro-service noting that the design output by DESG1 was verified according to a predefined coverage in IMPL1, but that owing to the design change in DESG2 occasioned by the change in specification in SPEC2, the DESG2 design is currently not optimally verified. In one option, a micro-service in IMPL2 may detect the suboptimal verification state of the DESG2 design as compared to the DESG1 design, and automatically generate a stub file TEST1 in the set of software components constituting the unit test of the design in life-cycle phase IMPL2. Optionally, the stub file may be preset to cause a compiler to fail when compiling the set of software components in IMPL2. The effect of this is to provide an automatic fail-safe such that when the design changes as a result of changes in SPEC2, portions of the design that require re-verification in IMPL2 are re-verified.

In track 82, the updated ECU 22 moves to an operational life-cycle phase OPRS2 in which, for example, an operational life-cycle micro-service host 48 automatically spawns and hosts a monitoring micro-service to ensure that the specification change to close down the CAN bus port associated with anomalous CAN communication, as implemented in life-cycle phase IMPL2, has had the effect of removing the anomalous communication.

In track 82, an example is given of a situation where a full instantiation of a total life-cycle redesign of an ECU 22 does not occur. Instead, a previous design from previous instantiation DESG2 is implemented in an alternative way (perhaps using a different software or hardware BOM), thus requiring an additional test TEST2 in an instantiation of an implementation phase IMPL3, leading to OPRS3. This is an example where the disclosed technique assist the update of submodules of an ECU 22 design, rather than necessitating a complete redesign.

In an embodiment, the first lifecycle phase is a design phase (DSGN), and the second lifecycle phase is an implementation phase (IMPL), and the method further comprises:

in the design phase, detecting, using the first automation engine, a change to the design of the system expressed in a portion of the persistent configuration record defining the design of the system;

in the design phase, updating, using the first automation engine (EP1), a portion of the persistent configuration record relating to the implementation phase so that unit tests covering the change to the design of the system can be automatically or manually generated; and in the implementation phase (IMPL), automatically generating and/or monitoring for the manual generation of the unit tests based on the portion of the persistent configuration record relating to the implementation phase.

In an embodiment, the first lifecycle phase is an operational phase (OPRS), and the second lifecycle phase is an implementation phase (IMPL) of a subsequent instantiation of the plurality of lifecycle stages, and:

in the operational phase (IMPL), using the first automation engine to automatically examine system logs to detect anomalous communication between elements of the system; and if anomalous communications are detected, using the first automation engine to update portions of the persistent configuration record referring to the implementation phase (IMPL) of a subsequent instantiation of the plurality of lifecycle stages; and in the implementation phase (IMPL) of a subsequent instantiation of the plurality of lifecycle stages, automatically generating unit tests that mimic the using the anomalous communications using the second automation engine, and testing the system for response to the anomalous communications.

In an embodiment, the method comprises:

reading the persistent configuration record and/or monitoring the first and/or second automation engines using a security information processor configured to implement data analysis and/or machine learning; and outputting, to a user, results concerning the events and/or target actions observed during the plurality of lifecycle stages of the system.

As an example, the method may comprise using a machine learning algorithm to perform anomaly detection or outlier detection by comparing records written to the persistent data record by various microservices at different lifecycle phases. In this way, the machine learning algorithm is able to trace occurrences in an operational life cycle phase back to specific actions taken in the implementation, design, or specification phase. For example, the requirement to use a specific item of software that may be configured in the design phase in first and second configurations may be associated with a security exploit in an operational phase when configured in the first configuration, but not the second. A machine learning algorithm can identify such subtle patterns over a long development process that may involve hundreds or thousands of human developers, for example. Machine learning approaches may be applied using supervised learning, where a model is trained using input from human analysts before being applied to the persistent data record. Unsupervised learning, reinforcement learning, Bayesian approaches, Neural networks, generative adversarial networks, association rule learning, and many other suitable techniques may be applied to the data in the persistent data record.

The results may be output to a user in different ways, dependent on the lifecycle phase. In a specification lifecycle phase, the portions of the specification associated with an unacceptable risk in a subsequent lifecycle phase may be indicated by highlighting that portion of the specification in the form of a coloured highlight or an automatically generated comment. In the design phase, the detection of an unsafe design pattern or specification of insecure hardware and software may trigger an update email or message to members of the design team for that particular part of the project. In the implementation phase, the machine learning may generate particular unit tests or unit test stubs to be filled out by an analyst.

According to a second aspect, there is provided a computer system comprising at least one computing apparatus comprising a data memory, an input-output interface, and a processor, wherein the computer system is configured to perform the method according to the first aspect.

According to a third aspect, there is provided a computer readable medium or signal comprising computer readable instructions which, when executed by a computer processor, execute the method according to the first aspect.

According to a fourth aspect, there is provided an embedded software and/or hardware system configured according to the persistent configuration record generated according to the method of the first aspect, wherein the embedded software and/or hardware system is optionally an electronic control unit (ECU) for controlling a vehicle.

The examples provided in the figures and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications, and further applications to these within the scope of the specification are desired to be protected.

What is claimed is:

1. A computer-implemented method for security-driven lifecycle control of a configurable system, the method comprising:

maintaining, in a non-transitory data store, a persistent configuration record that defines system design constraints and limitations that restrict allowable system architectures, component interactions, or implementation features, wherein the system design constraints and limitations are used during a plurality of lifecycle stages of the system as inputs that constrain execution of the plurality of lifecycle stages, the lifecycle stages including at least a specification stage, a design stage, an implementation stage, and an operational stage, wherein each of the lifecycle stages is instantiated as a respective stage instance in each of a plurality of lifecycle instances;

executing, during the operational stage instance of a first one of the lifecycle instances of the system, the system in accordance with a first version of the persistent configuration record;

during the execution in the operational stage instance of the first lifecycle instance, detecting, by monitoring logic executed by one or more processors, an operational security condition occurring in the system;

in response to the detection of the operational security condition, writing, by the one or more processors, a security condition entry into the persistent configuration record, the security condition entry identifying at least:

(i) a type of the operational security condition; and (ii) to which of the lifecycle stages the operational security condition is to be propagated;

storing the persistent configuration record including the security condition entry such that the security condition entry remains available after completion of the first lifecycle instance;

initiating a second one of the lifecycle instances of the system after completion of the first lifecycle instance;

during the instance of the identified lifecycle stage of the second lifecycle instance, reading the security condition entry from the persistent configuration record; and executing the instance of the identified lifecycle stage of the second lifecycle instance differently than in the first lifecycle instance based on modified system design constraints and limitations resulting from the security condition entry, such that the execution of the instance of the identified lifecycle stage, in the second lifecycle instance, produces a modified definition of the system, comprising a modified system specification, system design, or system implementation, relative to the first lifecycle instance.

2. The computer implemented method according to claim 1, wherein the operational stage of the first one of the instances of the lifecycle stages is completed before the other instance of each of at least one of the specification stage, design stage, and implementation stage has begun, such that the persistent configuration record including the security condition entry communicates the occurrence of the operational security condition into the other instance of each of at least one of the specification stage, design stage, and implementation stage.

3. The computer implemented method according to claim 1, wherein:

the identified lifecycle stage to which the operational security condition is propagated comprises at least the specification stage of the second lifecycle instance;

detecting the operational security condition during execution of the operational stage instance of the first lifecycle instance comprises monitoring a threat information source for identification of a newly disclosed security vulnerability applicable to the the system writing the security condition entry into the persistent configuration record comprises updating a portion of the persistent configuration record associated with the specification stage to include information identifying the newly disclosed security vulnerability; and during execution of the specification stage instance of the second lifecycle instance, the system design constraints and limitations defined by the persistent configuration record are evaluated to examine a system attack model, threat model, or attack tree of the system in view of the newly disclosed security vulnerability.

4. The computer implemented method according to claim 1, further comprising:

reading, by a security information processor, the persistent configuration record comprising security condition entries written during a plurality of lifecycle instances;

analyzing evolution of system design constraints and limitations across the plurality of lifecycle instances based on the security isecurity condition entriess; and outputting, to a user, information indicative of how detected operational security conditions have influenced execution of one or more lifecycle stages and resulting system definitions across the plurality of lifecycle instances.

5. The computer implemented method according to claim 1, wherein the system is an embedded electronic control unit for controlling a vehicle.

6. The computer implemented method according to claim 1, wherein executing the second lifecycle instance differently comprises recompiling executable code for the system based on the modified system design constraints and limitations.

7. The computer implemented method according to claim 1, wherein executing the second lifecycle instance differently comprises substituting or patching at least one software module of system in accordance with the modified system design constraints and limitations.

8. The computer implemented method according to claim 1, wherein executing the second lifecycle instance differently comprises generating a new software module for inclusion in the system based on the modified system design constraints and limitations.

9. The computer implemented method according to claim 1, wherein the system design constraints and limitations defined by the persistent configuration record comprise any one or more of the group consisting of:

restrictions on allowable communication paths between system components;

requirements for inclusion of specified security mechanisms;

limitations on permitted component interactions; and requirements for execution of specified security tests or analyses during at least one lifecycle stage.

10. The computer implemented method according to claim 1, wherein the identified lifecycle stage to which the operational security condition is propagated any one or more of the group consisting of the specification stage, the design stage, and the implementation stage.

11. The computer implemented method according to claim 1, wherein the modified system definition produced during the second lifecycle instance is stored and used as an input to at least one subsequent lifecycle instance of the system.

12. The computer implemented method according to claim 1, wherein writing the security condition entry into the persistent configuration record causes modification of at least one system design constraint or limitation that was not present during the first lifecycle instance.

13. The computer implemented method according to claim 1, wherein the modified system definition produced during the second lifecycle instance controls execution of a subsequent operational stage such that runtime behavior of the system differs from runtime behavior during the first lifecycle instance.

14. The computer implemented method according to claim 1, wherein execution of the identified lifecycle stage during the second lifecycle instance is automatically performed based on the modified system design constraints and limitations without requiring manual modification of the persistent configuration record.

15. The computer implemented method according to claim 1, wherein:

the specification stage comprises defining functional requirements, security requirements, or usage constraints for the system;

the design stage comprises defining a system architecture, component structure, or permitted interactions between system components in accordance with the functional and security requirements;

the implementation stage comprises generating, modifying, or validating executable code, configuration data, or other deployable system representations in accordance with the system architecture and the system design constraints and limitations; and the operational stage comprises executing the system in a deployed environment and monitoring system behavior during execution.

16. The computer-implemented method according to claim 1, wherein:

the identified lifecycle stage to which the operational security condition is propagated comprises at least the specification stage of the second lifecycle instance;

detecting the operational security condition during execution of the operational stage instance of the first lifecycle instance comprises observing qualitative information characterizing a threat environment associated with the system;

writing the security condition entry into the persistent configuration record comprises updating a portion of the persistent configuration record associated with the specification stage to reflect the observed qualitative threat environment information; and during execution of the specification stage instance of the second lifecycle instance, the system design constraints and limitations defined by the persistent configuration record are modified to adjust a threat assessment score associated with the system or with at least one system component, such that the adjusted threat assessment score influences execution of the specification stage in the second lifecycle instance.

17. The computer-implemented method according to claim 1, wherein:

executing the identified lifecycle stage during the second lifecycle instance comprises executing the design stage;

during execution of the design stage instance of the second lifecycle instance, a change to a system design expressed in a portion of the persistent configuration record defining system architecture or component interactions is detected;

the method comprises, in response to detecting the change to the system design, updating a portion of the persistent configuration record associated with the implementation stage to define test requirements corresponding to the detected change; and during execution of the implementation stage instance of the second lifecycle instance, automatically generating or validating unit tests based on the updated portion of the persistent configuration record associated with the implementation stage.

18. The computer implemented method according to claim 17, wherein:

executing the implementation stage instance of the second lifecycle instance further comprises coupling an automation engine to a hardware in a loop testbed configured to replicate one or more hardware components of the system; and the method further comprises performing tests using the hardware in the loop testbed.

19. The computer-implemented method according to claim 1, wherein the security condition entry comprises a plurality of entries including (i) a declaration of the operational security condition and (ii) a lifecycle stage identifier identifying the lifecycle stage to which propagation is directed.

20. A computer system, comprising:

at least one computing apparatus including a data memory, an input-output interface, and one or more processors, wherein the computer system is configured to perform security-driven lifecycle control of a configurable system by performing the following:

maintaining, in a non-transitory data store, a persistent configuration record that defines system design constraints and limitations that restrict allowable system architectures, component interactions, or implementation features, wherein the system design constraints and limitations are used during a plurality of lifecycle stages of the system as inputs that constrain execution of the plurality of lifecycle stages, the lifecycle stages including at least a specification stage, a design stage, an implementation stage, and an operational stage, and wherein each of the lifecycle stages is instantiated as a respective stage instance in each of a plurality of lifecycle instances;

executing, during the operational stage instance of a first one of the lifecycle instances of the system, the system in accordance with a first version of the persistent configuration record;

during the execution in the operational stage instance of the first lifecycle instance, detecting, by monitoring logic executed by the one or more processors, an operational security condition occurring in the system;

in response to detecting the operational security condition, writing, by the one or more processors, a security condition entry into the persistent configuration record, the security condition entry identifying at least:

(i) a type of the operational security condition; and (ii) to which of the lifecycle stages the operational security condition is to be propagated;

storing the persistent configuration record including the security condition entry such that the security condition entry remains available after completion of the first lifecycle instance;

initiating a second one of the lifecycle instances of the system after completion of the first lifecycle instance;

during the instance of the identified lifecycle stage of the second lifecycle instance, reading the security condition entry from the persistent configuration record; and executing the instance of the identified lifecycle stage of the second lifecycle instance differently than in the first lifecycle instance based on modified system design constraints and limitations resulting from the security condition entry, such that the execution of the instance of the identified lifecycle stage, in the second lifecycle instance, produces a modified definition of the system, comprising a modified system specification, system design, or system implementation, relative to the first lifecycle instance.

21. A non-transitory computer readable medium on which is stored a computer program that, when executed by one or more processors of a computer system, causes the computer system to perform security-driven lifecycle control of a configurable system by steps comprising:

maintaining, in a non-transitory data store, a persistent configuration record that defines system design constraints and limitations that restrict allowable system architectures, component interactions, or implementation features, wherein the system design constraints and limitations are used during a plurality of lifecycle stages of the system as inputs that constrain execution of the plurality of lifecycle stages, the lifecycle stages including at least a specification stage, a design stage, an implementation stage, and an operational stage, and wherein each of the lifecycle stages is instantiated as a respective stage instance in each of a plurality of lifecycle instances;

executing, during the operational stage instance of a first one of the lifecycle instances of the system, the system in accordance with a first version of the persistent configuration record;

during the execution in the operational stage instance of the first lifecycle instance, detecting, by monitoring logic executed by the one or more processors, an operational security condition occurring in the system;

in response to detecting the operational security condition, writing, by the one or more processors, a security condition entry into the persistent configuration record, the security condition entry identifying at least:

(i) a type of the operational security condition; and (ii) to which of the lifecycle stages the operational security condition is to be propagated;

storing the persistent configuration record including the security condition entry such that the security condition entry remains available after completion of the first lifecycle instance;

initiating a second one of the lifecycle instances of the system after completion of the first lifecycle instance;

during the instance of the identified lifecycle stage of the second lifecycle instance, reading the security condition entry from the persistent configuration record; and executing the instance of the identified lifecycle stage of the second lifecycle instance differently than in the first lifecycle instance based on modified system design constraints and limitations resulting from the security condition entry, such that the execution of the instance of the identified lifecycle stage, in the second lifecycle instance, produces a modified definition of the system, comprising a modified system specification, system design, or system implementation, relative to the first lifecycle instance.

* * * * *